(12) United States Patent
Xu (10) Patent No.: US 10,505,235 B2
(45) Date of Patent: Dec. 10, 2019

(54) RECYCLING APPARATUS FOR WASTE LITHIUM BATTERY

(71) Applicant: Congjie Ye, Pujiang County (CN)

(72) Inventor: Min Xu, Wenzhou (CN)

(*) Notice: Subject to any disclaimer, the term of this patent is extended or adjusted under 35 U.S.C. 154(b) by 0 days.

(21) Appl. No.: 16/228,766

(22) Filed: Dec. 21, 2018

(65) Prior Publication Data

US 2019/0123403 A1 Apr. 25, 2019

(30) Foreign Application Priority Data

Nov. 28, 2018 (CN) .......................... 2018 1 14329012

(51) Int. Cl.
*H01M 10/54* (2006.01)
*C22B 3/00* (2006.01)

(52) U.S. Cl.
CPC ........... *H01M 10/54* (2013.01); *C22B 11/046* (2013.01)

(58) Field of Classification Search
CPC ....... C22B 11/046; C22B 26/12; C22B 7/007; C22B 7/008; H01M 10/54
See application file for complete search history.

(56) References Cited

U.S. PATENT DOCUMENTS

| | | | | |
|---|---|---|---|---|
| 4,637,928 A | * | 1/1987 | Zajac, Jr. ................ | H01M 6/52 241/27 |
| 5,456,992 A | * | 10/1995 | Elliott ...................... | C22B 1/24 266/115 |
| 5,597,526 A | | 1/1997 | Nishimura et al. | |
| 5,694,019 A | * | 12/1997 | Uchida .................. | H01M 10/46 320/106 |
| 5,879,829 A | * | 3/1999 | Nishimura ............... | C22B 7/00 29/763 |
| 6,618,644 B2 | * | 9/2003 | Bean ........................ | G07F 7/06 700/231 |
| 2011/0311844 A1 | * | 12/2011 | Han ...................... | H01M 10/54 429/49 |
| 2018/0026318 A1 | | 1/2018 | Shin et al. | |
| 2019/0123403 A1 | * | 4/2019 | Xu ........................ | C22B 11/046 |

FOREIGN PATENT DOCUMENTS

| | | |
|---|---|---|
| CN | 107083484 A | 8/2017 |
| EP | 1780826 A1 | 5/2007 |

* cited by examiner

*Primary Examiner* — Minh N Trinh (57) ABSTRACT

This invention discloses a recycling apparatus for waste lithium battery, comprising a main body, a lithium battery recycling device disposed in the main body, wherein, the lithium battery recycling device comprises a dissolution device disposed in the main body, wherein the dissolution device comprises dissolution cavities symmetrically disposed in two sides of the main body; a pushing cavity communicated with the inner wall of the upper side of the dissolution cavities; a pushing device disposed in the pushing cavity; wherein the lithium battery is put into one of the dissolution cavities for alkaline dissolving through the solution in the dissolution cavity and part of the metals are extracted. The lithium battery is then pushed to the other one of the dissolution cavities for further acidic dissolution through the pushing device. Thus the recycling of the metals in the waste battery will be realized.

6 Claims, 4 Drawing Sheets

RECYCLING APPARATUS FOR WASTE LITHIUM BATTERY

CROSS-REFERENCES TO RELATED APPLICATIONS

The present application claims priority from Chinese application No. 2018114329012 filed on 2018 Nov. 28 which is hereby incorporated by reference in its entirety.

FIELD OF THE INVENTION

This invention relates to the technical field of battery recycling, in particular to a recycling apparatus for waste lithium battery.

BACKGROUND ART

In many occasions in life, electric energy storage devices are needed to store electric energy. And precious metals and heavy metals are often used in manufacturing storage batteries. But it will not only cause environmental pollution, but also waste precious metals in the storage battery if discarding it everywhere. Accordingly, the present invention is directed to an apparatus for recycling of the precious metals in storage batteries by dissolving them, thus reducing environmental pollution and the cost of storage battery production.

BRIEF SUMMARY OF THE INVENTION

The purpose of the invention is to provide a recycling apparatus for waste lithium battery so as to overcome the problems existing in the prior art.

A recycling apparatus for waste lithium battery in this invention comprises a main body, a lithium battery recycling device disposed in said main body, wherein, said lithium battery recycling device comprises a dissolution device disposed in said main body, wherein said dissolution device comprises dissolution cavities symmetrically disposed in two sides of said main body, wherein, one of the dissolution cavities proceeds acidic dissolution with the acidic solution inside, and the other one of the dissolution cavities proceeds alkaline dissolution with the alkaline solution inside; a pushing cavity with an opening to one side communicated with the inner wall of the upper side of said dissolution cavities; a pushing device disposed in said pushing cavity, wherein said pushing device pushes alkaline dissolved waste of lithium battery to the dissolution cavity for acidic dissolution, while pushing acidic dissolved waste of lithium battery in said dissolution cavity to the outside of said pushing cavity through the opening; a lithium battery crushing device arranged in the inner wall of the upper side of said pushing cavity, wherein said lithium battery crushing device comprises a feed inlet with an upward opening arranged in said main body, wherein, the waste lithium battery can be crushed by said lithium battery crushing device after being put into said feed inlet and then it falls into the other one of said dissolution cavities through said pushing cavity for alkaline dissolution; wherein the lithium battery will be processed by said lithium battery crushing device, said pushing device and said dissolution device and the useful precious metals can be dissolved in the acidic dissolution and the alkaline dissolution and they will be extracted through subsequent processing.

Wherein, said dissolution device further comprises a water outlet communicated with the inner wall of the lower side of said dissolution cavities; an electrically controlled switch fixedly arranged between the inner wall of said water outlet, wherein, the solution in said dissolution cavities can be discharged when said electrically controlled switch is turned on; a slideable filter block disposed in said dissolution cavities, wherein said filter block can block the battery waste above the upper end face of said filter block, while the solution can go through said filter block; a dissolution transmission cavity in said main body disposed between said dissolution cavities on both sides; a dissolution switching cavity communicated with the inner wall of the upper side of said dissolution transmission cavity; a slideable motor fixer set in said dissolution switching cavity; a dissolution slipping groove communicated with the inner wall of the upper side of said dissolution switching cavity; a fixed dissolution switching motor disposed in the inner wall of the one side of said dissolution slipping groove; a rotatable dissolution transmission lead screw in said dissolution slipping groove in power matching connection with one side of said dissolution switching motor; a dissolution switching sliding block in threaded fit connection with said dissolution transmission lead screw and extended into said dissolution slipping groove fixedly connected with the surface of the upper side of said motor fixer; a fixed filter block driving motor disposed in said motor fixer; a rotatable dissolution driving gear in said dissolution transmission cavity in power matching connection with the lower side of said filter block driving motor through a revolving shaft; dissolution driven gears engaged with said dissolution driving gear symmetrically and rotatably disposed on two sides of said dissolution driving gear; dissolution sliding grooves respectively communicated with said dissolution cavities on both sides symmetrically disposed in the inner wall of the ends, close to each other, of said symmetrical dissolution cavities on both sides; rotatable dissolution elevating lead screws in said dissolution sliding grooves fixedly connected to the upper end face of said symmetrical dissolution driven gears through a revolving shaft; wherein, the end face, close to one side of said dissolution sliding groove, of said filter block, is provided with a dissolution elevating block fixedly connected thereto and extended into said dissolution sliding groove and in threaded fit connection with said dissolution elevating lead screw.

Wherein torsion spring cavities symmetrically set on two sides are communicated with the inner wall of the lower side of said dissolution transmission cavity; rotatable torsion spring connecting blocks in said dissolution torsion spring cavities are fixedly connected to the lower end face of said dissolution driven gear through a revolving shaft; a return torsion spring is connected between the peripheral curved end face of said torsion spring connecting block and the inner wall of said torsion spring cavity; wherein, when in use, said filter block driving motor drives said dissolution elevating lead screw to rotate through said dissolution driving gear, further elevating said filter block in the corresponding dissolution cavity, further pushing the waste lithium battery in said filter block upwards and pushing the processed waste lithium battery to next procedure through said pushing device; when said dissolution driving gear disengages from said dissolution driven gear, deformation of the corresponding return torsion spring will drive the corresponding dissolution elevating lead screw to rotate reversely, further driving the corresponding filter block to descend to the initial position.

Wherein, said lithium battery crushing device comprises a feed inlet with an upward opening arranged in said main body; a crushing wheel rotatably disposed between the inner walls of two sides of said feed inlet, wherein one side of said crushing wheel is rotatably connected to the inner wall of one side of said feed inlet through bearings, while the inner wall of the other side of said feed inlet is communicated with a crushing transmission cavity; wherein the other side of said crushing wheel extends into said crushing transmission cavity and is connected with a rotatable driven pulley in said crushing transmission cavity; rotatable driving pulleys in said crushing transmission cavities set in the sides, far away from each other, of said symmetrical driven pulleys; a driving belt wound around said driving pulley and said driven pulley; a rotatable first bevel gear in said crushing transmission cavity fixedly connected with one side of said driving pulley through a revolving shaft; a rotatable second bevel gear in said crushing transmission cavity engaged with the one end, away from said feed inlet, of said first bevel gear; a rotatable first gear in said crushing transmission cavity connected with the side, away from said feed inlet, of said second bevel gear through a same shaft; a driving cavity communicated with the inner wall of one side of said feed inlet; a transmission pulley rotatably arranged between the inner walls of two sides of said driving cavity, wherein two ends of said transmission pulley in power matching connection with fixed transmission motors in the inner walls of two sides of said driving cavity through a revolving shaft; a rotatable second gear in said crushing transmission cavity in power matching connection with the one end, away from said transmission pulley, of said transmission motor through a revolving shaft; a rotatable third gear in said crushing transmission cavity connected between said second gear and said first gear; a conveying cavity communicated with the lower end of the inner wall of the other side of said feed inlet; a conveying pulley rotatably disposed between the inner walls of two sides of said conveying cavity; a conveying belt wound around said conveying pulley and said transmission pulley; wherein the lithium battery will fall on said conveying belt after being crushed by said crushing wheel, and will be conveyed into the dissolution device through said conveying belt.

Wherein, a leaking tank is communicated with the inner wall of the lower side of said feed inlet, wherein a filter plate is fixedly arranged on the upper opening of said leaking tank and a water outlet with an opening to one side is communicated with the inner lower wall of one side of said leaking tank; a spray nozzle is fixedly set on the inner upper wall of the other side of said feed inlet, wherein said spray nozzle is used for cooling the lithium battery when it is being crushed.

Wherein, said pushing device comprises said pushing cavity with an opening to one side in the inner upper wall of said dissolution cavities; a feed hole communicated between the inner upper wall which is close to the inner wall of one side of said pushing cavity and the inner lower wall of said conveying cavity; a partitioning chute communicated with the inner wall, close to the lower opening, of said feed hole; a slideable partitioning sliding plate disposed in said partitioning chute; a partitioning guide chute communicated with the inner upper wall of said partitioning chute; a partitioning guide slider extended into said partitioning guide chute fixedly connected to the upper end face of said partitioning sliding plate; a partitioning return spring connected between one end wall of said partitioning guide slider and the one inner wall of said partitioning guide chute; a push block extended into said pushing cavity fixedly connected to one end of the lower part of said partitioning sliding plate; a slideable pusher block in said pushing cavity set in one side of said push block; pushing chutes symmetrically disposed in the inner walls of two sides of said pushing cavity; a pushing motor fixedly set in one inner wall of said pushing chute; a pushing lead screw in power matching connection with one side of said pushing motor; a pushing slider which is in threaded connection with said pushing lead screw slideably set in said pushing chute; a push connecting slot communicated between the inner walls of said pushing chute and said pushing cavity; wherein a slideable push connecting block in said push connecting slot fixedly connected between opposite end walls of said pushing slider and said pusher block.

The benefits of the invention are as follows: the invention is simple in structure and it is easy to operate it. When in use, two steps are followed by this apparatus that metals in the storage battery are first dissolved and then metals in the waste battery are recycled. Hence difficulties in dealing with the waste storage battery nowadays can be solved and the recycled precious metals can be put into production of the storage battery, further greatly lowing the production cost of the storage battery, in particular to that of the lithium battery. Thus the apparatus is recommended for use.

DETAILED DESCRIPTION OF THE INVENTION

Figure 1:
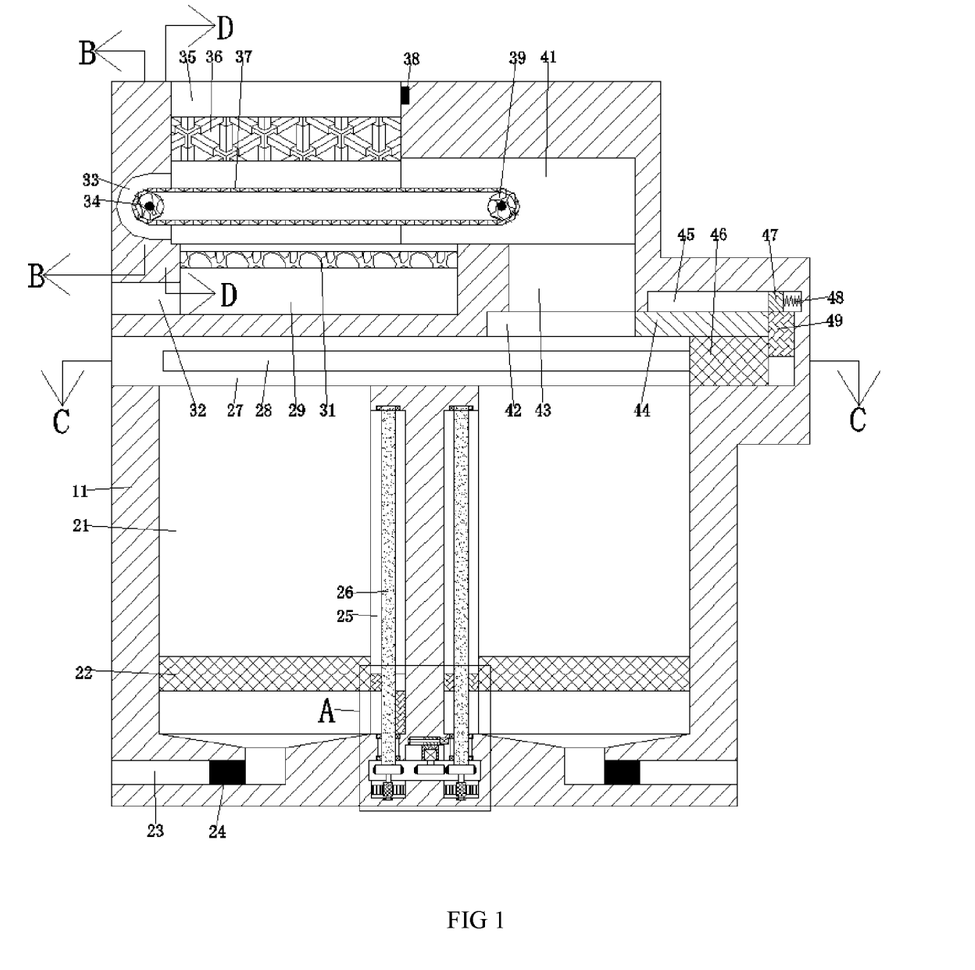
FIG. 1 is a schematic structural diagram depicting an overall configuration inside a recycling apparatus for waste lithium battery in this invention.
Figure 2:
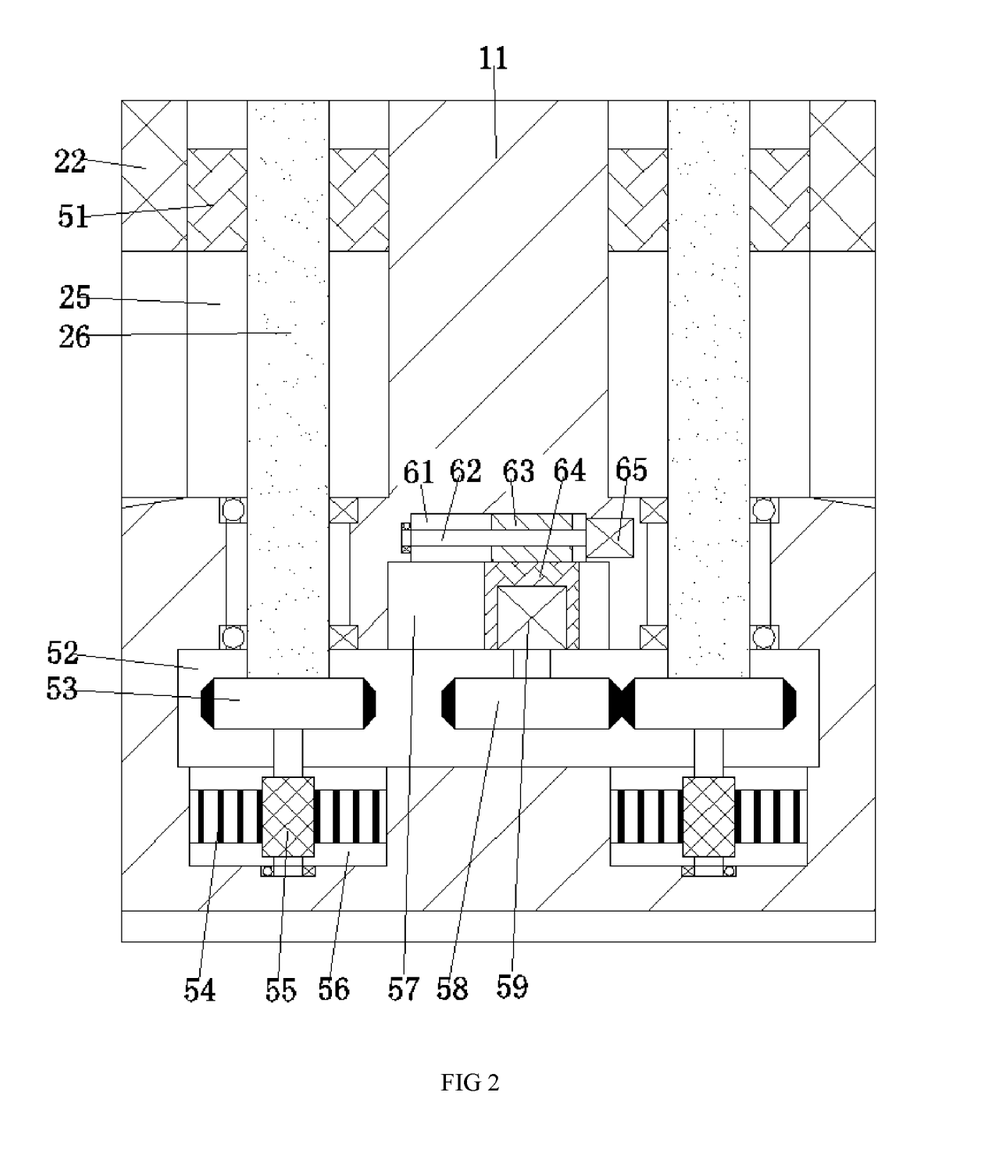
FIG. 2 is the enlarged schematic diagram of "A" part in FIG. 1.
Figure 3:
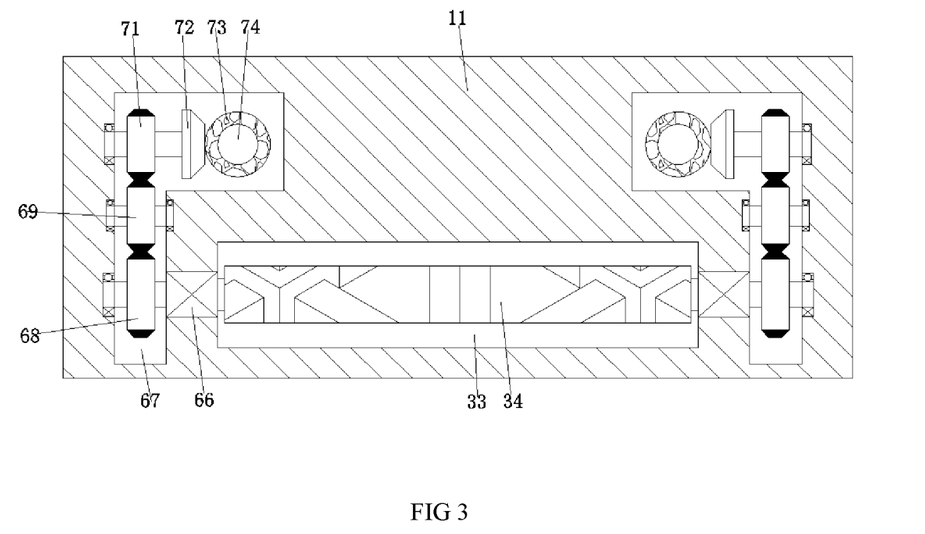
FIG. 3 is the schematic structural diagram along "B-B" direction in FIG. 1.
Figure 4:
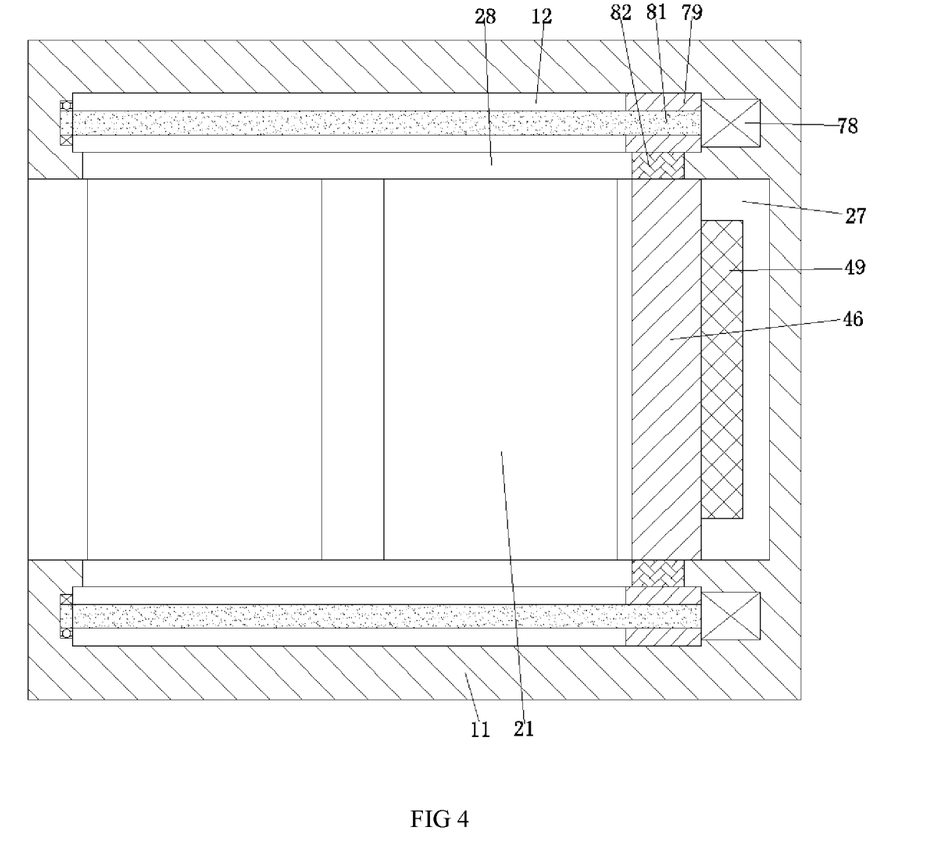
FIG. 4 is the schematic structural diagram along "C-C" direction in FIG. 1.
Figure 5:
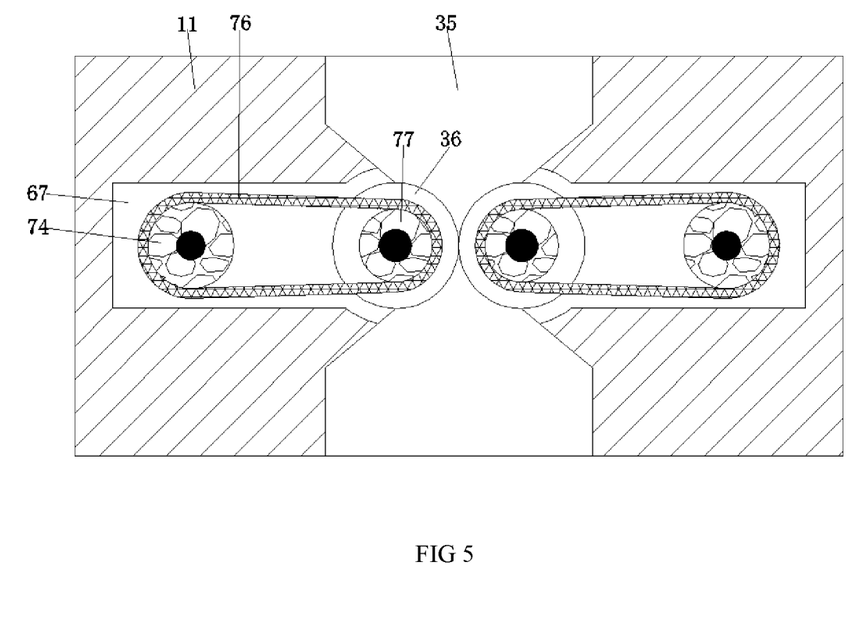
FIG. 5 is the schematic structural diagram along "D-D" direction in FIG. 1.

Referring to FIG. 1 to FIG. 5, a recycling apparatus for waste lithium battery in this invention comprises a main body 11, a lithium battery recycling device disposed in said main body 11, wherein, said lithium battery recycling device comprises a dissolution device disposed in said main body 11, wherein said dissolution device comprises dissolution cavities 21 symmetrically disposed in two sides of said main body 11, wherein, one of the dissolution cavities 21 proceeds acidic dissolution with the acidic solution inside, and the other one of the dissolution cavities 21 proceeds alkaline dissolution with the alkaline solution inside; a pushing cavity 27 with an opening to one side communicated with the inner wall of the upper side of said dissolution cavities 21; a pushing device disposed in said pushing cavity 27, wherein said pushing device pushes alkaline dissolved waste of lithium battery to the dissolution cavity 21 for acidic dissolution, while pushing acidic dissolved waste of lithium battery in said dissolution cavity 21 to the outside of said pushing cavity 27 through the opening; a lithium battery crushing device arranged in the inner wall of the upper side of said pushing cavity 27, wherein said lithium battery crushing device comprises a feed inlet 35 with an upward opening arranged in said main body 11, wherein, the waste lithium battery can be crushed by said lithium battery crushing device after being put into said feed inlet 35 and then it falls into the other one of said dissolution cavities 21 through said pushing cavity 27 for alkaline dissolution; wherein the lithium battery will be processed by said lithium battery crushing device, said pushing device and said dissolution device and the useful precious metals can be dissolved in the acidic dissolution and the alkaline dissolution and they will be extracted through subsequent processing.

Beneficially, said dissolution device further comprises a water outlet 23 communicated with the inner wall of the lower side of said dissolution cavities 21; an electrically controlled switch 24 fixedly arranged between the inner wall of said water outlet 23, wherein, the solution in said dissolution cavities 21 can be discharged when said electrically controlled switch 24 is turned on; a slideable filter block 22 disposed in said dissolution cavities 21, wherein said filter block 22 can block the battery waste above the upper end face of said filter block 22, while the solution can go through said filter block 22; a dissolution transmission cavity 52 in said main body 11 disposed between said dissolution cavities 21 on both sides; a dissolution switching cavity 57 communicated with the inner wall of the upper side of said dissolution transmission cavity 52; a slideable motor fixer 64 set in said dissolution switching cavity 57; a dissolution slipping groove 61 communicated with the inner wall of the upper side of said dissolution switching cavity 57; a fixed dissolution switching motor 65 disposed in the inner wall of the one side of said dissolution slipping groove 61; a rotatable dissolution transmission lead screw 62 in said dissolution slipping groove 61 in power matching connection with one side of said dissolution switching motor 65; a dissolution switching sliding block 63 in threaded fit connection with said dissolution transmission lead screw 62 and extended into said dissolution slipping groove 61 fixedly connected with the surface of the upper side of said motor fixer 64; a fixed filter block driving motor 59 disposed in said motor fixer 64; a rotatable dissolution driving gear 58 in said dissolution transmission cavity 52 in power matching connection with the lower side of said filter block driving motor 59 through a revolving shaft; dissolution driven gears 53 engaged with said dissolution driving gear 58 symmetrically and rotatably disposed on two sides of said dissolution driving gear 58; dissolution sliding grooves 25 respectively communicated with said dissolution cavities 21 on both sides symmetrically disposed in the inner wall of the ends, close to each other, of said symmetrical dissolution cavities 21 on both sides; rotatable dissolution elevating lead screws 26 in said dissolution sliding grooves 25 fixedly connected to the upper end face of said symmetrical dissolution driven gears 53 through a revolving shaft; wherein, the end face, close to one side of said dissolution sliding groove 25, of said filter block 22, is provided with a dissolution elevating block 51 fixedly connected thereto and extended into said dissolution sliding groove 25 and in threaded fit connection with said dissolution elevating lead screw 26.

Beneficially, wherein torsion spring cavities 56 symmetrically set on two sides are communicated with the inner wall of the lower side of said dissolution transmission cavity 52; rotatable torsion spring connecting blocks 55 in said dissolution torsion spring cavities 56 are fixedly connected to the lower end face of said dissolution driven gear 53 through a revolving shaft; a return torsion spring 54 is connected between the peripheral curved end face of said torsion spring connecting block 55 and the inner wall of said torsion spring cavity 56; wherein, when in use, said filter block driving motor 59 drives said dissolution elevating lead screw 26 to rotate through said dissolution driving gear 58, further elevating said filter block 22 in the corresponding dissolution cavity 21, further pushing the waste lithium battery in said filter block 22 upwards and pushing the processed waste lithium battery to next procedure through said pushing device; when said dissolution driving gear 58 disengages from said dissolution driven gear 53, deformation of the corresponding return torsion spring 54 will drive the corresponding dissolution elevating lead screw 26 to rotate reversely, further driving the corresponding filter block 22 to descend to the initial position.

Beneficially, said lithium battery crushing device comprises a feed inlet 35 with an upward opening arranged in said main body 11; a crushing wheel 36 rotatably disposed between the inner walls of two sides of said feed inlet 35, wherein, one side of said crushing wheel 36 is rotatably connected to the inner wall of one side of said feed inlet 35 through bearings, while the inner wall of the other side of said feed inlet 35 is communicated with a crushing transmission cavity 67; wherein the other side of said crushing wheel 36 extends into said crushing transmission cavity 67 and is connected with a rotatable driven pulley 77 in said crushing transmission cavity 67; rotatable driving pulleys 74 in said crushing transmission cavities 67 set in the sides, far away from each other, of said symmetrical driven pulleys 77; a driving belt 76 wound around said driving pulley 74 and said driven pulley 77; a rotatable first bevel gear 73 in said crushing transmission cavity 67 fixedly connected with one side of said driving pulley 74 through a revolving shaft; a rotatable second bevel gear 72 in said crushing transmission cavity 67 engaged with the one end, away from said feed inlet 35, of said first bevel gear 73; a rotatable first gear 71 in said crushing transmission cavity 67 connected with the side, away from said feed inlet 35, of said second bevel gear 72 through a same shaft; a driving cavity 33 communicated with the inner wall of one side of said feed inlet 35; a transmission pulley 34 rotatably arranged between the inner walls of two sides of said driving cavity 33, wherein two ends of said transmission pulley 34 in power matching connection with fixed transmission motors 66 in the inner walls of two sides of said driving cavity 33 through a revolving shaft; a rotatable second gear 68 in said crushing transmission cavity 67 in power matching connection with the one end, away from said transmission pulley 34, of said transmission motor 66 through a revolving shaft; wherein, a rotatable third gear 69 in said crushing transmission cavity 67 is connected between said second gear 68 and said first gear 71; a conveying cavity 41 communicated with the lower end of the inner wall of the other side of said feed inlet 35; a conveying pulley 39 rotatably disposed between the inner walls of two sides of said conveying cavity 41; a conveying belt 37 wound around said conveying pulley 39 and said transmission pulley 34; wherein the lithium battery will fall on said conveying belt 37 after being crushed by said crushing wheel 36, and will be conveyed into the dissolution device through said conveying belt 37.

Beneficially, a leaking tank 29 is communicated with the inner wall of the lower side of said feed inlet 35, wherein a filter plate 31 is fixedly arranged on the upper opening of said leaking tank 29 and a water outlet 32 with an opening to one side is communicated with the inner lower wall of one side of said leaking tank 29; a spray nozzle 38 is fixedly set on the inner upper wall of the other side of said feed inlet 35, wherein said spray nozzle 38 is used for cooling the lithium battery when it is being crushed.

Beneficially, said pushing device comprises said pushing cavity 27 with an opening to one side in the inner upper wall of said dissolution cavities 21; a feed hole 43 communicated between the inner upper wall which is close to the inner wall of one side of said pushing cavity 27 and the inner lower wall of said conveying cavity 41; a partitioning chute 42 communicated with the inner wall, close to the lower opening, of said feed hole 43; a slideable partitioning sliding plate 44 disposed in said partitioning chute 42; a partitioning guide chute 45 communicated with the inner upper wall of said partitioning chute 42; a partitioning guide slider 47 extended into said partitioning guide chute 45 fixedly connected to the upper end face of said partitioning sliding plate 44; a partitioning return spring 48 connected between one end wall of said partitioning guide slider 47 and the one inner wall of said partitioning guide chute 45; a push block 49 extended into said pushing cavity 27 fixedly connected to one end of the lower part of said partitioning sliding plate 44; a slideable pusher block 46 in said pushing cavity 27 set in one side of said push block 49; pushing chutes 12 symmetrically disposed in the inner walls of two sides of said pushing cavity 27; a pushing motor 78 fixedly set in one inner wall of said pushing chute 12; a pushing lead screw 81 in power matching connection with one side of said pushing motor 78; a pushing slider 79 which is in threaded connection with said pushing lead screw 81 slideably set in said pushing chute 12; a push connecting slot 28 communicated between the inner walls of said pushing chute 12 and said pushing cavity 27; wherein a slideable push connecting block 82 in said push connecting slot 28 fixedly connected between opposite end walls of said pushing slider 79 and said pusher block 46.

When in initial state, the filter block 22 maximizes its descending in the dissolution cavity 21, while one end face of the dissolution switching sliding block 63 touches against one inner wall of said dissolution slipping groove 61, and one end face of the motor fixer 64 touches against one inner wall of the dissolution switching cavity 57; the dissolution driving gear 58 engages with one dissolution driven gear 53; one end face of the pusher block 46 touches against one end wall of the push block 49, and the other end wall of the push block 49 touches against one inner wall of the pushing cavity 27 and the partitioning chute 42; meanwhile the lower opening of the feed hole 43 communicates with the pushing cavity 27 and the transmission motor 66 is in a static state.

When using this apparatus for the recycling of the waste lithium battery, the transmission motor 66 is first started, driving the transmission pulley 34 to rotate through a revolving shaft, further driving the conveying belt 37 to rotate; meanwhile the transmission motor 66 drives the second gear 68 to rotate through a revolving shaft, driving the first gear 71 to rotate through the third gear 69, further driving the first bevel gear 73 to rotate through the second bevel gear 72, further driving the driving belt 76 to rotate through the driving pulley 74 and driving the crushing wheel 36 to rotate through the driven pulley 77, and then the lithium battery put into the feed inlet 35 is crushed, while the spray nozzle 38 sprays water into the feed inlet 35 to lower the high temperature of the lithium battery resulting from the crushing process. At the same time, the crushed lithium battery falls on the upper end wall of the conveying belt 37 and is conveyed to one side of the conveying cavity 41 through the conveying belt 37, and then it falls into one of the dissolution cavities 21 through the feed hole 43. When the crushed lithium battery reaches to a certain amount, the transmission motor 66 ceases to rotate, and the lithium battery is put into one of the dissolution cavities 21 for dissolving through the solution in the dissolution cavity 21 and part of the metals are extracted. When the dissolution in the dissolution cavity 21 is completed, the filter block driving motor 59 is started to drive the dissolution driving gear 58 to rotate through a revolving shaft, driving one of the dissolution driven gears 53 to rotate, further driving one of the dissolution elevating lead screws 26 to rotate, further driving one of the filter blocks 22 to be elevated in the corresponding dissolution cavity 21 through the corresponding dissolution slipping groove 61 and driving the waste lithium battery which fell into the corresponding dissolution cavity 21 to be elevated in the corresponding dissolution cavity 21. When the upper end wall of the corresponding filter block 22 is flush with the inner lower wall of the pushing cavity 27, the pushing motor 78 is started to drive the pushing slider 79 to move to one side through the pushing lead screw 81, driving the pusher block 46 to slide to the same side through the push connecting block 82, and meanwhile the push block 49 moves to the same side under the force of the partitioning return spring 48, driving the partitioning sliding plate 44 to partition the lower opening of the feed hole 43. At the same time, the pusher block 46 pushes the lithium battery which has been pushed into the pushing cavity 27 to the same side and into the other one of the dissolution cavities 21 for further dissolution. When the dissolution is completed, the dissolution switching motor 65 is started to drive the dissolution switching sliding block 63 to move to one side in the dissolution slipping groove 61 through the dissolution transmission lead screw 62, further driving the motor fixer 64 to move to the same side and driving the dissolution driving gear 58 to engage with one of the dissolution driven gears 53. At the same time, the dissolution driving gear 58 is started to drive one of the filter blocks 22 to be elevated through the corresponding dissolution elevating lead screw 26, and the processed waste lithium battery will be pushed out of the one opening of the pushing cavity 27 through the pusher block 46. During the process, when the dissolution driving gear 58 disengages from the dissolution driven gear 53, the return torsion spring 54 will drive the corresponding dissolution elevating lead screw 26 to rotate reversely, further driving the corresponding filter block 22 to descend in the corresponding dissolution cavity 21.

The benefits of the invention are as follows: the invention is simple in structure and it is easy to operate it. When in use, two steps are followed by this apparatus that metals in the storage battery are first dissolved and then metals in the waste battery are recycled. Hence difficulties in dealing with the waste storage battery nowadays can be solved and the recycled precious metals can be put into production of the storage battery, further greatly lowing the production cost of the storage battery, in particular to that of the lithium battery. Thus the apparatus is recommended for use.

Persons skilled in the art should understand that, the invention will be subject to various changes based on its intention and extent, which will also fall into the claimed protection extent of this invention. The claimed extent of the invention shall be determined with reference to the appended claims.

The invention claimed is:
1. A recycling apparatus for waste lithium battery in this invention, comprising
a main body;
a lithium battery recycling device disposed in said main body,
wherein, said lithium battery recycling device comprises a dissolution device disposed in said main body,
wherein said dissolution device comprises dissolution cavities symmetrically disposed in two sides of said main body,
wherein, one of the dissolution cavities proceeds acidic dissolution with the acidic solution inside, and the other one of the dissolution cavities proceeds alkaline dissolution with the alkaline solution inside;
a pushing cavity with an opening to one side communicated with the inner wall of the upper side of said dissolution cavities;
a pushing device disposed in said pushing cavity,
wherein said pushing device pushes alkaline dissolved waste of lithium battery to the dissolution cavity for acidic dissolution, while pushing acidic dissolved waste of lithium battery in said dissolution cavity to the outside of said pushing cavity through the opening;
a lithium battery crushing device arranged in the inner wall of the upper side of said pushing cavity,
wherein said lithium battery crushing device comprises a feed inlet with an upward opening arranged in said main body,
wherein, the waste lithium battery can be crushed by said lithium battery crushing device after being put into said feed inlet and then it falls into the other one of said dissolution cavities through said pushing cavity for alkaline dissolution;
wherein the lithium battery will be processed by said lithium battery crushing device, said pushing device and said dissolution device and the useful precious metals can be dissolved in the acidic dissolution and the alkaline dissolution and they will be extracted through subsequent processing.

2. The recycling apparatus for waste lithium battery of claim 1, wherein said dissolution device further comprises
a water outlet communicated with the inner wall of the lower side of said dissolution cavities;
an electrically controlled switch fixedly arranged between the inner wall of said water outlet,
wherein, the solution in said dissolution cavities can be discharged when said electrically controlled switch is turned on;
a slideable filter block disposed in said dissolution cavities,
wherein said filter block can block the battery waste above the upper end face of said filter block, while the solution can go through said filter block;
a dissolution transmission cavity in said main body disposed between said dissolution cavities on both sides;
a dissolution switching cavity communicated with the inner wall of the upper side of said dissolution transmission cavity;
a slideable motor fixer set in said dissolution switching cavity;
a dissolution slipping groove communicated with the inner wall of the upper side of said dissolution switching cavity;
a fixed dissolution switching motor disposed in the inner wall of the one side of said dissolution slipping groove;
a rotatable dissolution transmission lead screw in said dissolution slipping groove in power matching connection with one side of said dissolution switching motor;
a dissolution switching sliding block in threaded fit connection with said dissolution transmission lead screw and extended into said dissolution slipping groove fixedly connected with the surface of the upper side of said motor fixer;
a fixed filter block driving motor disposed in said motor fixer;
a rotatable dissolution driving gear in said dissolution transmission cavity in power matching connection with the lower side of said filter block driving motor through a revolving shaft;
dissolution driven gears engaged with said dissolution driving gear symmetrically and rotatably disposed on two sides of said dissolution driving gear;
dissolution sliding grooves respectively communicated with said dissolution cavities on both sides symmetrically disposed in the inner wall of the ends, close to each other, of said symmetrical dissolution cavities on both sides;
rotatable dissolution elevating lead screws in said dissolution sliding grooves fixedly connected to the upper end face of said symmetrical dissolution driven gears through a revolving shaft;
wherein, the end face, close to one side of said dissolution sliding groove, of said filter block, is provided with a dissolution elevating block fixedly connected thereto and extended into said dissolution sliding groove and in threaded fit connection with said dissolution elevating lead screw.

3. The recycling apparatus for waste lithium battery of claim 2, wherein torsion spring cavities symmetrically set on two sides are communicated with the inner wall of the lower side of said dissolution transmission cavity;
rotatable torsion spring connecting blocks in said dissolution torsion spring cavities are fixedly connected to the lower end face of said dissolution driven gear through a revolving shaft;
a return torsion spring is connected between the peripheral curved end face of said torsion spring connecting block and the inner wall of said torsion spring cavity;
wherein, when in use, said filter block driving motor drives said dissolution elevating lead screw to rotate through said dissolution driving gear, further elevating said filter block in the corresponding dissolution cavity, further pushing the waste lithium battery in said filter block upwards and pushing the processed waste lithium battery to next procedure through said pushing device;
when said dissolution driving gear disengages from said dissolution driven gear, deformation of the corresponding return torsion spring will drive the corresponding dissolution elevating lead screw to rotate reversely, further driving the corresponding filter block to descend to the initial position.

4. The recycling apparatus for waste lithium battery of claim 1, wherein said lithium battery crushing device comprises
a feed inlet with an upward opening arranged in said main body;
a crushing wheel rotatably disposed between the inner walls of two sides of said feed inlet,
wherein one side of said crushing wheel is rotatably connected to the inner wall of one side of said feed inlet through bearings, while the inner wall of the other side of said feed inlet is communicated with a crushing transmission cavity;
wherein the other side of said crushing wheel extends into said crushing transmission cavity and is connected with a rotatable driven pulley in said crushing transmission cavity;
rotatable driving pulleys in said crushing transmission cavities set in the sides, far away from each other, of said symmetrical driven pulleys;
a driving belt wound around said driving pulley and said driven pulley;
a rotatable first bevel gear in said crushing transmission cavity fixedly connected with one side of said driving pulley through a revolving shaft;

a rotatable second bevel gear in said crushing transmission cavity engaged with the one end, away from said feed inlet, of said first bevel gear;

a rotatable first gear in said crushing transmission cavity connected with the side, away from said feed inlet, of said second bevel gear through a same shaft;

a driving cavity communicated with the inner wall of one side of said feed inlet;

a transmission pulley rotatably arranged between the inner walls of two sides of said driving cavity, wherein two ends of said transmission pulley in power matching connection with fixed transmission motors in the inner walls of two sides of said driving cavity through a revolving shaft;

a rotatable second gear in said crushing transmission cavity in power matching connection with the one end, away from said transmission pulley, of said transmission motor through a revolving shaft;

a rotatable third gear in said crushing transmission cavity connected between said second gear and said first gear;

a conveying cavity communicated with the lower end of the inner wall of the other side of said feed inlet;

a conveying pulley rotatably disposed between the inner walls of two sides of said conveying cavity;

a conveying belt wound around said conveying pulley and said transmission pulley;

wherein the lithium battery will fall on said conveying belt after being crushed by said crushing wheel, and will be conveyed into the dissolution device through said conveying belt.

5. The recycling apparatus for waste lithium battery of claim 4, wherein a leaking tank is communicated with the inner wall of the lower side of said feed inlet, wherein a filter plate is fixedly arranged on the upper opening of said leaking tank and a water outlet with an opening to one side is communicated with the inner lower wall of one side of said leaking tank;

a spray nozzle is fixedly set on the inner upper wall of the other side of said feed inlet, wherein said spray nozzle is used for cooling the lithium battery when it is being crushed.

6. The recycling apparatus for waste lithium battery of claim 1, wherein said pushing device comprises said pushing cavity with an opening to one side in the inner upper wall of said dissolution cavities;

a feed hole communicated between the inner upper wall which is close to the inner wall of one side of said pushing cavity and the inner lower wall of said conveying cavity;

a partitioning chute communicated with the inner wall, close to the lower opening, of said feed hole;

a slideable partitioning sliding plate disposed in said partitioning chute;

a partitioning guide chute communicated with the inner upper wall of said partitioning chute;

a partitioning guide slider extended into said partitioning guide chute fixedly connected to the upper end face of said partitioning sliding plate;

a partitioning return spring connected between one end wall of said partitioning guide slider and the one inner wall of said partitioning guide chute;

a push block extended into said pushing cavity fixedly connected to one end of the lower part of said partitioning sliding plate;

a slideable pusher block in said pushing cavity set in one side of said push block;

pushing chutes symmetrically disposed in the inner walls of two sides of said pushing cavity;

a pushing motor fixedly set in one inner wall of said pushing chute;

a pushing lead screw in power matching connection with one side of said pushing motor;

a pushing slider which is in threaded connection with said pushing lead screw slideably set in said pushing chute;

a push connecting slot communicated between the inner walls of said pushing chute and said pushing cavity;

wherein a slideable push connecting block in said push connecting slot fixedly connected between opposite end walls of said pushing slider and said pusher block;

wherein the pushing motor is started to drive the pushing slider to move to one side through the pushing lead screw, driving the pusher block to slide to the same side through the push connecting block, and meanwhile the push block moves to the same side under the force of the partitioning return spring, driving the partitioning sliding plate to partition the lower opening of the feed hole, while at the same time, the pusher block pushes the lithium battery which has been pushed into the pushing cavity to the same side and into the other one of the dissolution cavities.

* * * * *